(12) United States Patent
Miller

(10) Patent No.: US 11,131,852 B2
(45) Date of Patent: Sep. 28, 2021

(54) VARIABLE ATTENUATION OF AN ILLUMINATION SOURCE

(71) Applicant: Microsoft Technology Licensing, LLC, Redmond, WA (US)

(72) Inventor: Joshua Owen Miller, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 719 days.

(21) Appl. No.: 15/981,382

(22) Filed: May 16, 2018

(65) Prior Publication Data
US 2019/0346679 A1    Nov. 14, 2019

Related U.S. Application Data

(60) Provisional application No. 62/668,836, filed on May 9, 2018.

(51) Int. Cl.
*G02B 27/01* (2006.01)
*G02F 1/29* (2006.01)

(52) U.S. Cl.
CPC .......... *G02B 27/0172* (2013.01); *G02F 1/29* (2013.01); *G02B 2027/0118* (2013.01); *G02F 2201/122* (2013.01); *G02F 2203/48* (2013.01)

(58) Field of Classification Search
CPC .......... F21V 17/02; F21V 13/02; F21V 13/12
USPC ........................................... 362/268
See application file for complete search history.

(56) References Cited

U.S. PATENT DOCUMENTS

| | | | |
|---|---|---|---|
| 2008/0049152 A1* | 2/2008 | Hong | G02B 30/50 349/11 |
| 2014/0028924 A1* | 1/2014 | Yamaguchi | G03B 17/565 349/1 |
| 2015/0346495 A1* | 12/2015 | Welch | G06F 1/163 345/8 |
| 2017/0307890 A1 | 10/2017 | Wang et al. | |

FOREIGN PATENT DOCUMENTS

WO    2013138191 A1    9/2013

OTHER PUBLICATIONS

"International Search Report and Written Opinion Issued in PCT Application No. PCT/US2019/029527", dated Sep. 23, 2019, 11 Pages.

\* cited by examiner

*Primary Examiner* — William J Carter
(74) *Attorney, Agent, or Firm* — Mark K. Young; Mayer & Williams, PC

(57) ABSTRACT

Variable attenuation of an illumination source is provided by an aperture (i.e., an opening in a structure through which light passes) that is sandwiched between two tunable lenses that are configured to apply varying amounts of optical power. A controller operates the first tunable lens to apply optical power to the light to be divergent at the aperture structure so that a portion of the light is clipped. Varying the applied optical power at the first tunable lens can increase or decrease divergence at the aperture structure to thereby increase or decrease clipping and the attenuation of the light. The controller operates the second tunable lens to compensate for changes in light state at the first tunable lens by applying opposite optical power so that collimated light from the illumination source which enters the first tunable lens may exit the second tunable lens in the same collimated state.

19 Claims, 16 Drawing Sheets

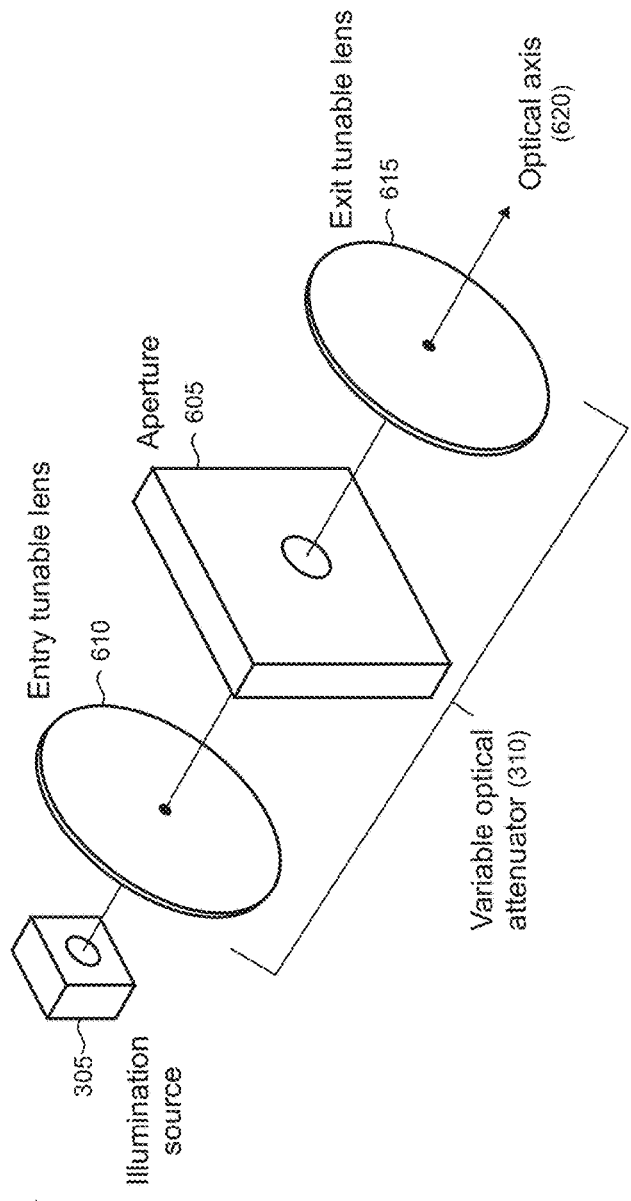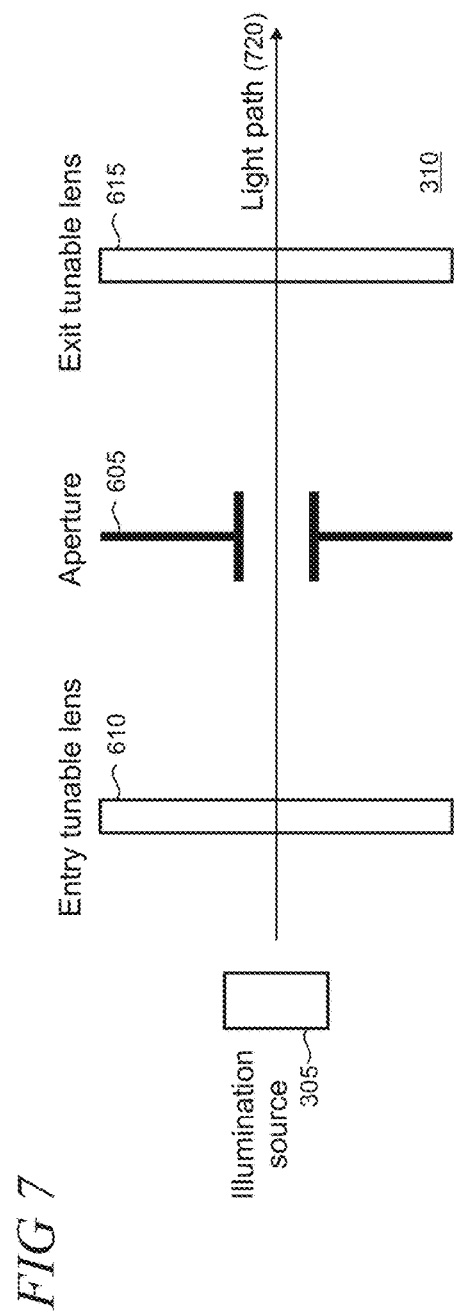
FIG 6
FIG 7

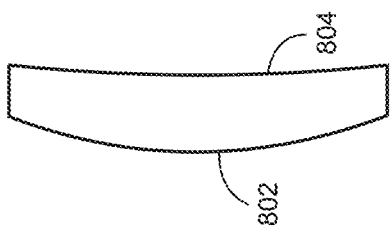
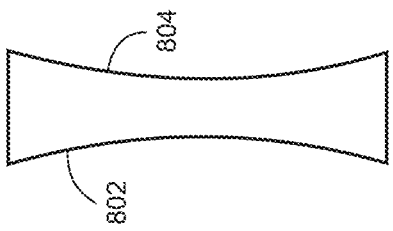
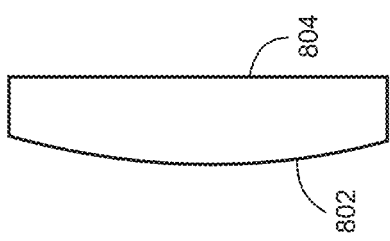
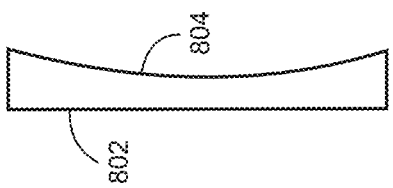
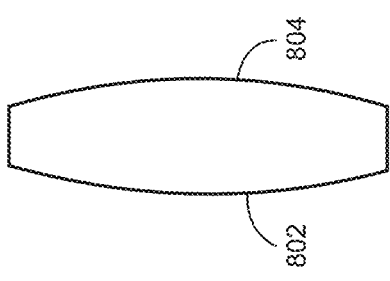
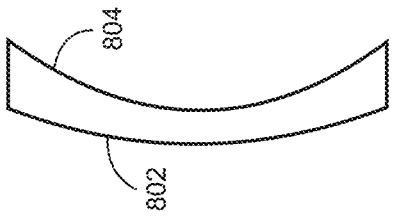

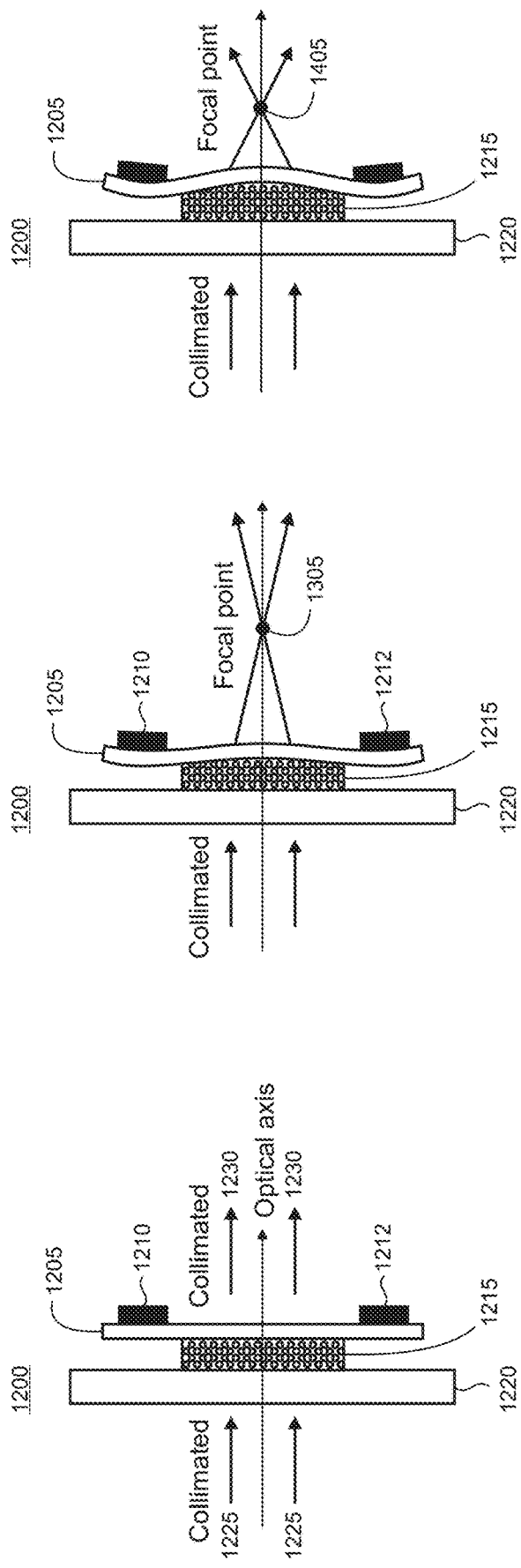

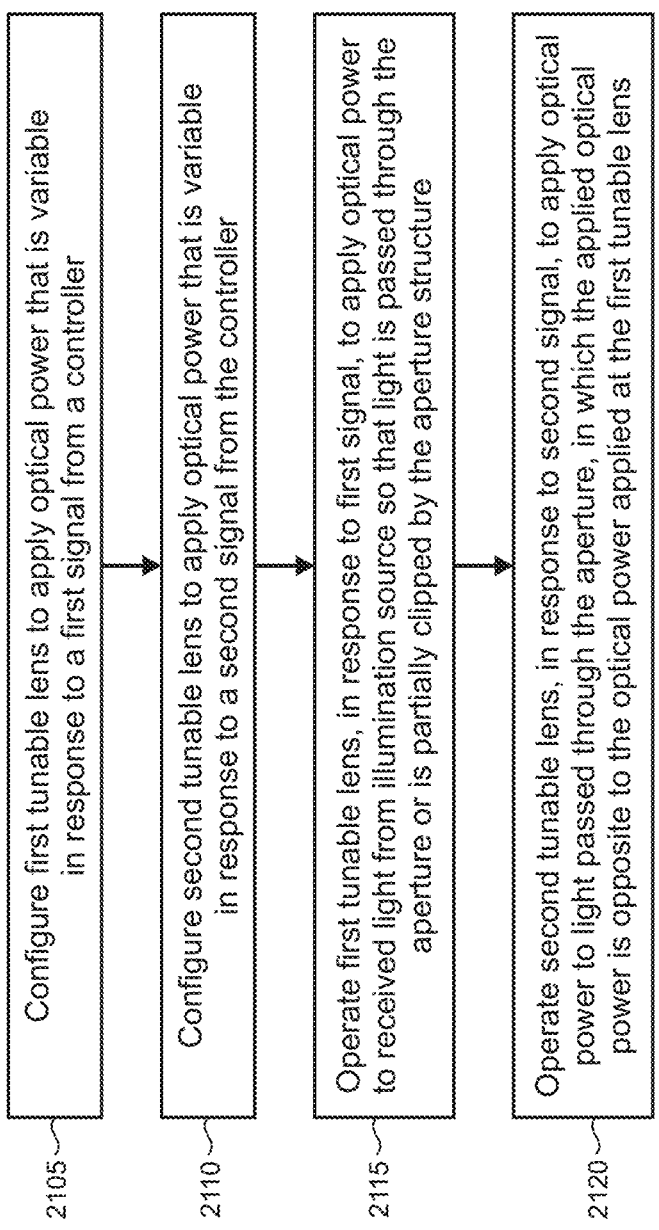

VARIABLE ATTENUATION OF AN ILLUMINATION SOURCE

CROSS-REFERENCE TO RELATED APPLICATIONS

This application claims benefit and priority to U.S. Provisional Application Ser. No. 62/668,836, filed May 9, 2018, entitled "VARIABLE ATTENUATION OF AN ILLUMINATION SOURCE," the disclosure of which is incorporated herein by reference in its entirety.

BACKGROUND

Illumination sources are typically utilized in display systems which can be utilized in environments having different levels of ambient light. Thus, the illumination source for the display system may be adjusted so that the display is brighter for high ambient lighting conditions and less bright for low ambient lighting conditions to maintain consistent perceived brightness. The source may also be adjusted to control display contrast.

SUMMARY

Variable attenuation of an illumination source is provided by an aperture (i.e., an opening in a structure through which light passes) that is sandwiched between two tunable lenses that are configured to apply varying amounts of optical power. The first tunable lens, aperture, and second tunable lenses are co-axially and respectively aligned along a light path extending from the illumination source. A controller operates the first tunable lens to apply optical power to the light from the illumination source to cause it to be divergent at the aperture structure so that a portion of the light is clipped at the structure and not passed through the aperture. Varying the applied optical power at the first tunable lens can increase or decrease divergence at the aperture structure to thereby increase or decrease clipping and the attenuation of the light from the illumination source. The controller operates the second tunable lens to compensate for changes in light state at the first tunable lens. Thus, for example, the first and second tunable lenses can apply opposite optical power so that collimated light from the illumination source which enters the first tunable lens may exit the second tunable lens in the same collimated state.

In various illustrative examples, the tunable lenses can be implemented using one or more optical surfaces having shapes that can be dynamically varied through application of a control signal to thereby provide the lenses with variable optical power. When the tunable lenses provide no optical power to the light from the illumination source, the light rays can remain collimated and a majority of the light can pass through the aperture. When the tunable lenses are operated to apply optical power, rays can be controllably clipped at the aperture structure to provide fine-grain control over the attenuation. The optical surfaces can comprise flexible glass membranes, liquid crystals, interfaces between immiscible fluids, or combinations thereof. Advantageously, the combination of tunable lenses and aperture provides for dynamic variable attenuation of the illumination source with high contrast ratio in a compact form factor.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure. It will be appreciated that the above-described subject matter may be implemented as a computer-controlled apparatus, a computer process, a computing system, or as an article of manufacture such as one or more computer-readable storage media. These and various other features will be apparent from a reading of the following Detailed Description and a review of the associated drawings.

DESCRIPTION OF THE DRAWINGS

FIG. 6 shows a pictorial view of an illustrative variable optical attenuator;

FIG. 7 is a functional block diagram of an illustrative variable optical attenuator;

FIGS. 10A-10F show various illustrative configurations of surfaces of a tunable lens;

FIGS. 12, 13, and 14 show operations of a first illustrative tunable lens that utilizes a thin bendable glass membrane and piezo elements;

FIG. 21 shows an illustrative method for operating a variable optical attenuator;

Like reference numerals indicate like elements in the drawings. Elements are not drawn to scale unless otherwise indicated.

DETAILED DESCRIPTION

Figure 1:
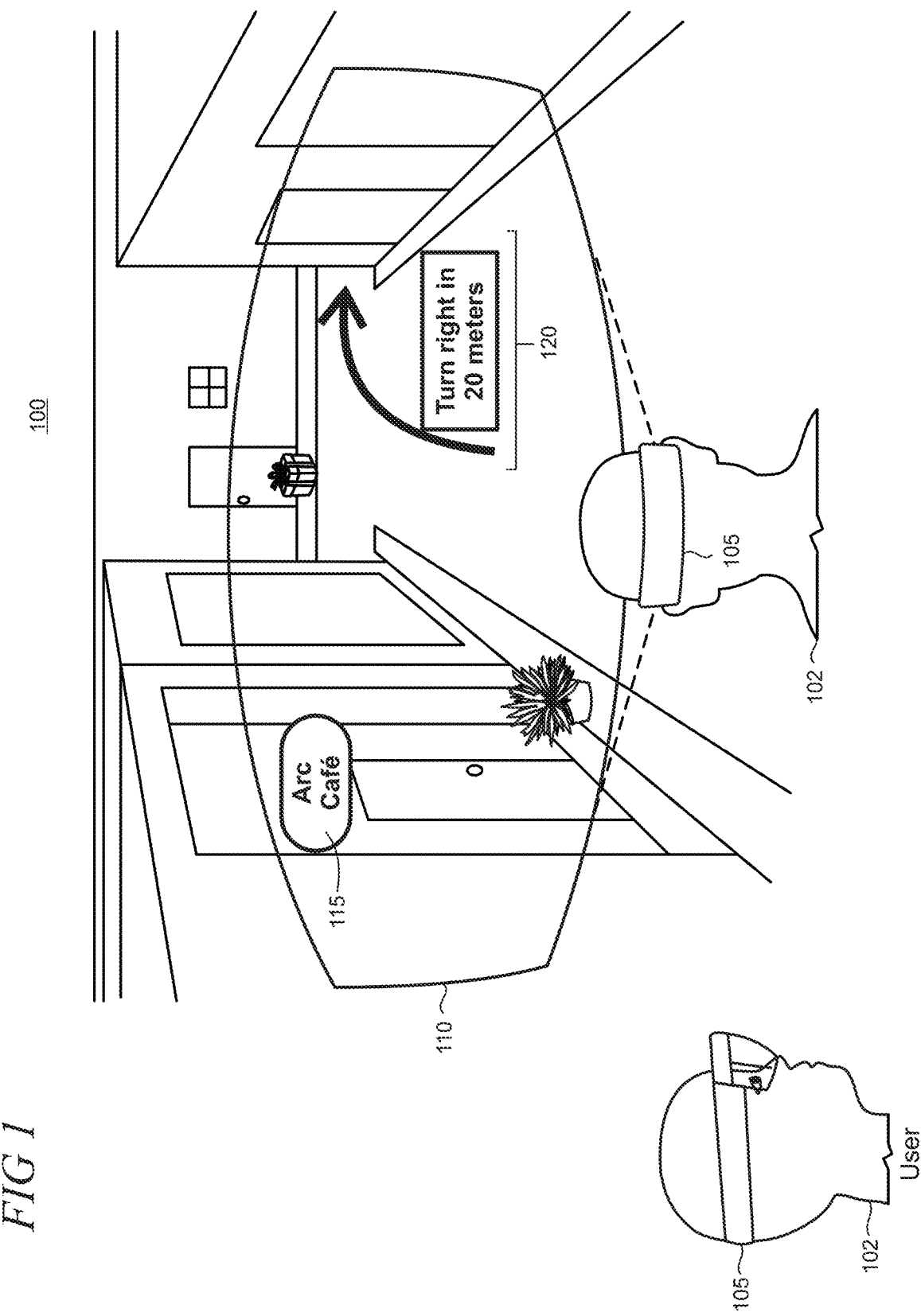
FIG. 1 shows an illustrative augmented reality environment, a portion of which is rendered within the field of view of a user of a head-mounted display (HMD) device.

FIG. 1 shows an illustrative augmented reality environment 100, a portion of which is rendered within the field of view (FOV) 110 of a user 102 of a head-mounted display (HMD) device 105. An augmented reality environment typically combines real-world elements and computer-generated virtual elements to enable a variety of user experiences. In this illustrative example, the user can employ the HMD device to experience an augmented reality environment that is rendered visually on a see-through optical display and may include audio and/or tactile/haptic sensations in some implementations.

In this particular non-limiting example, the HMD device user is physically walking in a real-world urban area that includes city streets with various buildings, stores, etc. The FOV of the cityscape supported on the HMD device changes as the user moves through the environment and the device can render virtual images over the view of the real world that is observed through the see-through display. Here, the virtual images illustratively include a tag 115 that identifies a restaurant business and directions 120 to a place of interest in the city.

Figure 2:
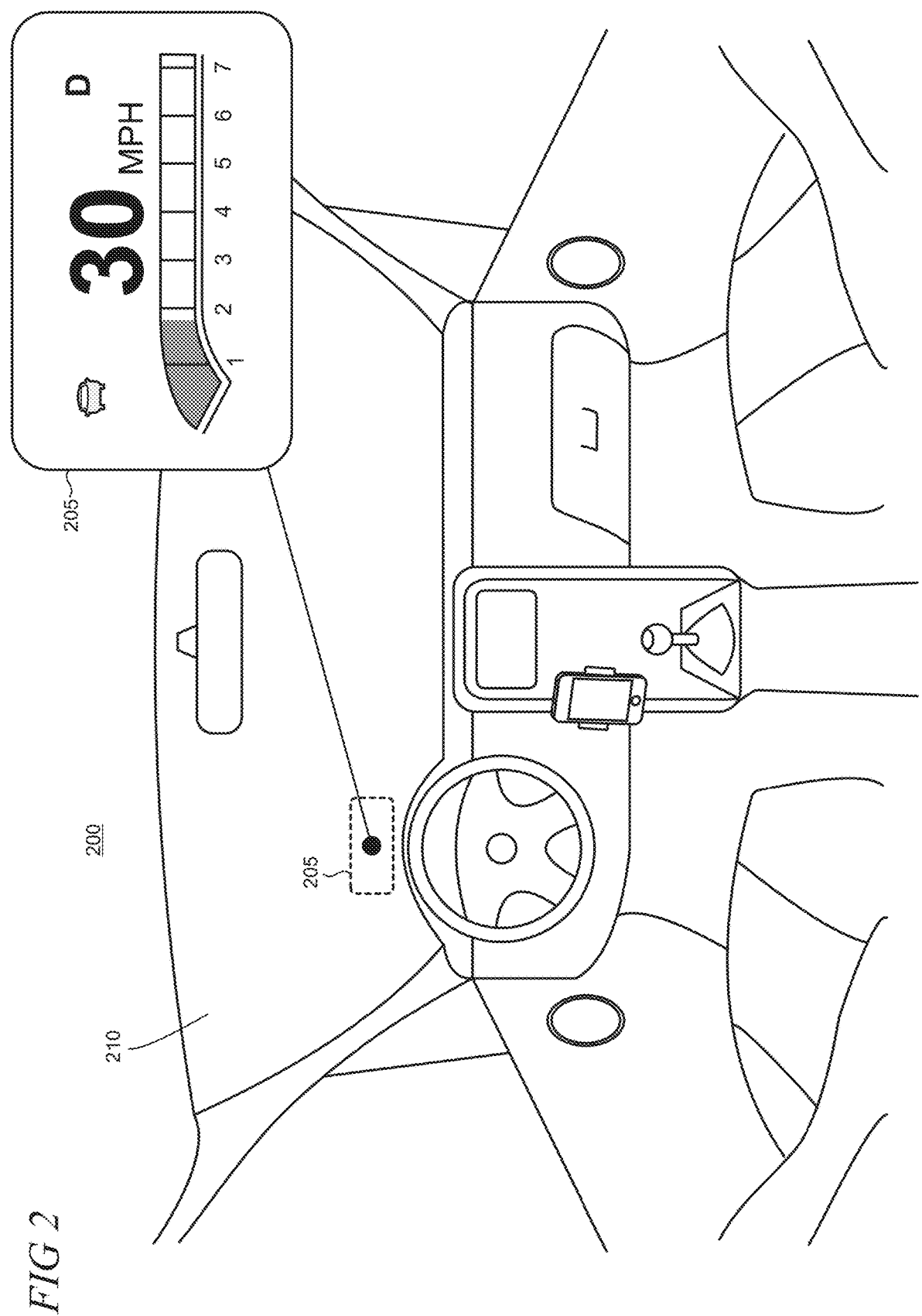
FIG. 2 shows an illustrative heads-up display (HUD) in an automobile.

FIG. 2 shows an illustrative automobile environment 200 in which a heads-up display (HUD) 205 is provided on the interior surface of a windshield 210. For example, information in the HUD 205, such as vehicle and engine speed, can be projected onto the windshield by a display system (not shown) in the automobile. The information is typically projected along the driver's line of sight so that the driver can maintain continuous awareness of both the road ahead and information from the HUD.

In both the HMD and HUD scenarios described above, the amount of ambient light in the environment can vary. For example, the devices may be used in bright sunlight during daytime, low/no light at night, and in various levels in between. Controlling the display brightness to match the prevailing conditions can thus be important to enhance both user comfort and intelligibility of the displayed information. The illumination source for the display is therefore typically configured to operate over a range of intensities.

The illumination source may be conventionally controlled through various means such as modulation of drive current amplitude or pulsed duty cycles to change the intensity of photon emission (i.e., optical power). Such intensity control may be adequate for gray scale implementations in some display systems. However, requirements beyond gray scale reproduction can often outpace the capabilities of such control systems and result in failure to reach a desired result. For example, illumination control systems may have limited dynamic range (i.e., bit depth) and/or pulse length when utilizing pulse width modulation (PWM) techniques. PWM performance may be further constrained by illumination source attributes such as rise time and relay time in response to an applied electrical control signal.

In addition to gray scale color control, an illumination control system may need to adjust display brightness to accommodate usage environments in which ambient light ranges from dim to bright. Such brightness adjustability is commonly implemented in conventional display systems in various devices including mobile phones, computer monitors, and televisions. Display systems utilized in augmented or mixed reality devices—like head-mounted display (HMD) devices and heads-up display (HUD) devices, which are typically utilized in environments with varying ambient light levels—can also benefit from effective illumination source control.

A liquid crystal (LC) attenuator may be utilized in some cases, in addition to, or as an alternative to amplitude control and pulse width modulation, to attenuate the intensity of the illumination source. However, LC devices respond differently across the visible light spectrum and may necessitate special considerations in some implementations. Additionally, depending on the desired reduction in illumination intensity, the LC material properties may limit system performance.

Figure 3:
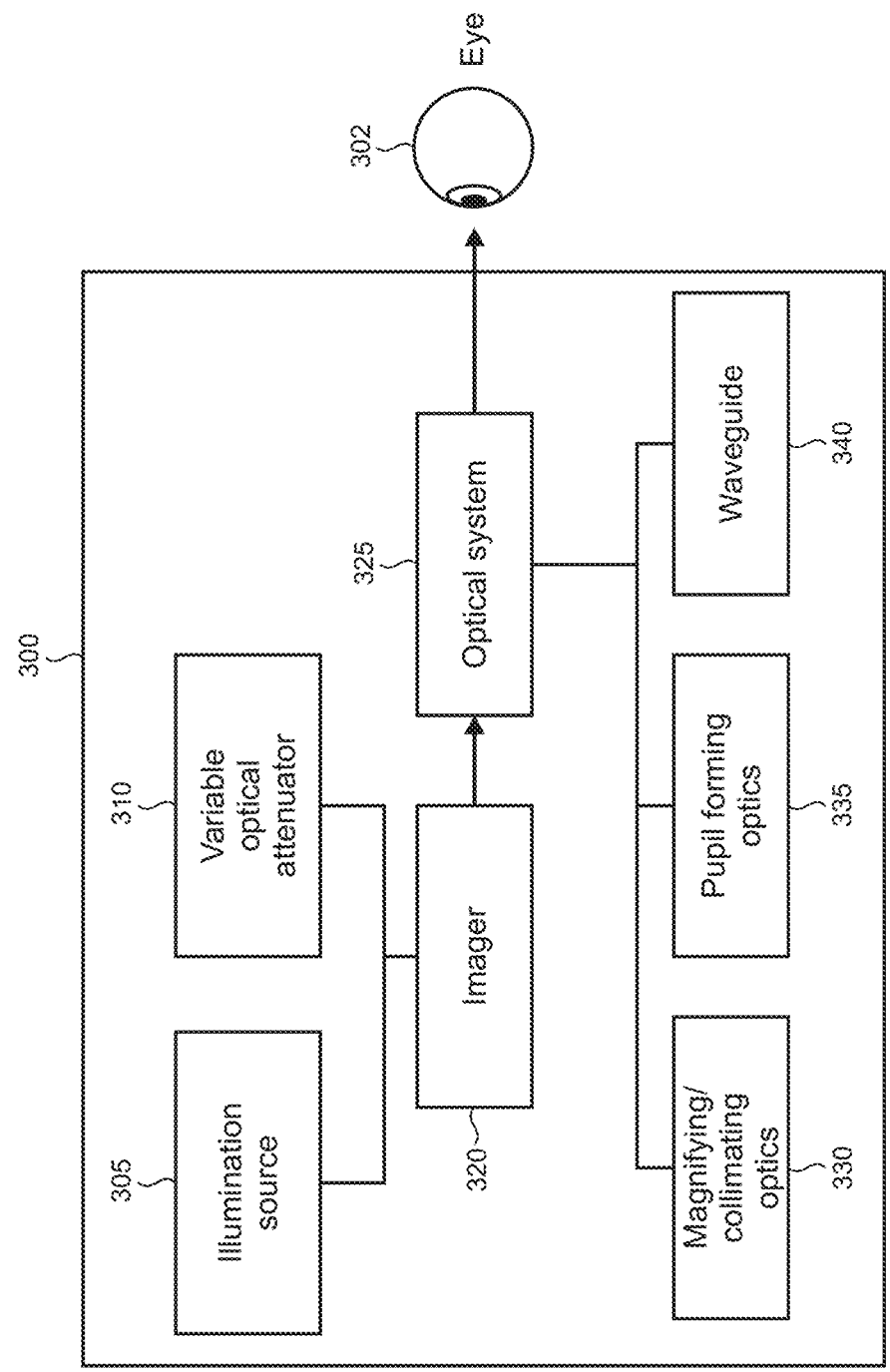
FIG. 3 shows a block diagram of an illustrative display system that can provide variable attenuation of an illumination source.

FIG. 3 shows a block diagram of an illustrative optical display system 300 which may implement the present variable attenuation of an illumination source. The optical display system may be utilized, in this illustrative example, in an HMD device. The HMD device display system 300 is illustratively utilized to provide context and demonstrate various features and aspects of an illustrative variable optical attenuator. However, the variable optical attenuator is not limited to HMD devices.

The display system 300 may include one or more imagers (representatively indicated by reference numeral 320) that work with an optical system 325 to deliver images as a virtual display to a user's eye 302. The optical system 325 includes, in this example, magnifying and/or collimating optics 330, pupil forming optics 335 (which may include an exit pupil expander (EPE)), and one or more waveguides 340. In HUD applications, the optical system 325 may include a projector and/or display screen (not shown). In some cases, various components of the optical system may be configured with sensitivity to polarized light.

The imager 320 includes an illumination source 305 such as a laser, laser diode, light emitting diode (LED), micro-LED, superluminescent LED (SLED), organic light emitting diode (OLED), or any other suitable illumination source. The illumination source is operated in combination with a variable optical attenuator 310. Collimating optics (not shown) may also be optionally utilized in some cases so that light rays at the variable optical attenuator are substantially parallel. Alternatively, the illumination source may be adapted to output collimated light or have collimating functionality incorporated in it.

Figure 4:
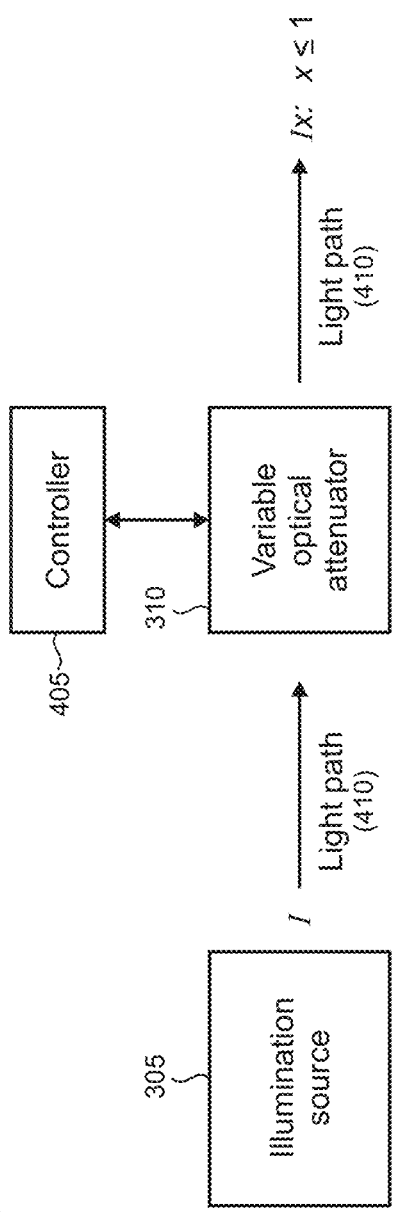
FIGS. 4 and 5 show alternative implementations for a variable optical attenuator.

The operative combination of the illumination source 305 and variable optical attenuator 310 is configured to variably reduce the optical intensity I of the source by x, where x≤1, as shown in FIG. 4. As shown, the source and variable optical attenuator are located in series along a light path 410. In this example, the illumination source is operated with a constant output level. The variable optical attenuator can be configured to operate dynamically in response to signals from a controller 405 to set a desired output intensity from the imager 320 (FIG. 3) into the optical system 325. Thus, for example, the output can be set higher when the display in an HMD or HUD device is operated in bright sunlight and dialed back in darker environments.

Figure 5:
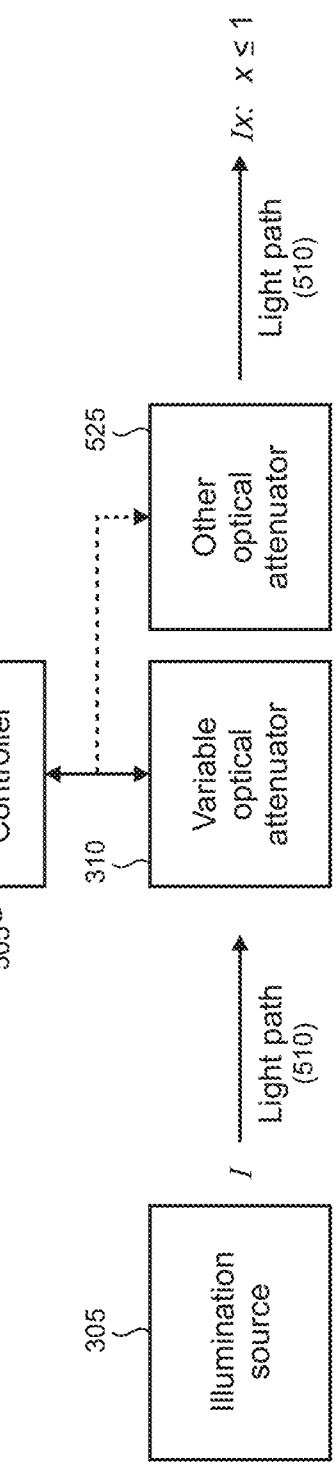

As shown in FIG. 5, the variable optical attenuator 310 may be used in operative combination with one or more other optical attenuators 525. The attenuators can be serially disposed along a light path 510 extending from the output of the illumination source 305. In some usage scenarios, the other optical attenuator may be implemented as a conventional LC-based attenuator that operates according to an applied voltage to provide varying amounts of attenuation. The other optical attenuator can be operated to supplement the operations of the variable optical attenuator in response to control signals from a controller 505. Various configurations can be utilized in the arrangement shown in FIG. 5, for example, the order on the light path can be reversed. In some cases, the functions of the attenuators (i.e., display brightness control and gray-scale control) can be handled by particular attenuators to thereby enable performance optimization according to function.

FIG. 6 shows an illustrative embodiment of the variable optical attenuator 310 that comprises an aperture structure 605 that is sandwiched between two tunable lenses (an entry tunable lens 610 and an exit tunable lens 615, respectively). The aperture structure 605 is configured with light blocking and light passing portions, as described in more detail below. The aperture structure and tunable lenses are co-axially aligned along a common optical axis 620. The entry tunable lens 610, the aperture structure 605, and the exit tunable lens are arranged for series operation along a light path 720 that extends from the output of the illumination source 305, as shown in FIG. 7. The aperture structure and tunable lenses are arranged with air gaps between them so light propagates along the light path in free space in this embodiment. However, in alternative implementations, various guided wave optical arrangements may be utilized, and/or the gaps between the components in the variable optical attenuator may be filled with a medium other than air.

The aperture structure 605 may be configured with an aperture that is a fixed size. In alternative implementations, the aperture size can be dynamically varied, for example, in response to a signal from the controller 405 (FIG. 4). In some cases, the aperture size can be modulated in combination with tunable lens operation to provide additional dynamic range and/or contrast ratio for the variable optical attenuator.

Figure 8:
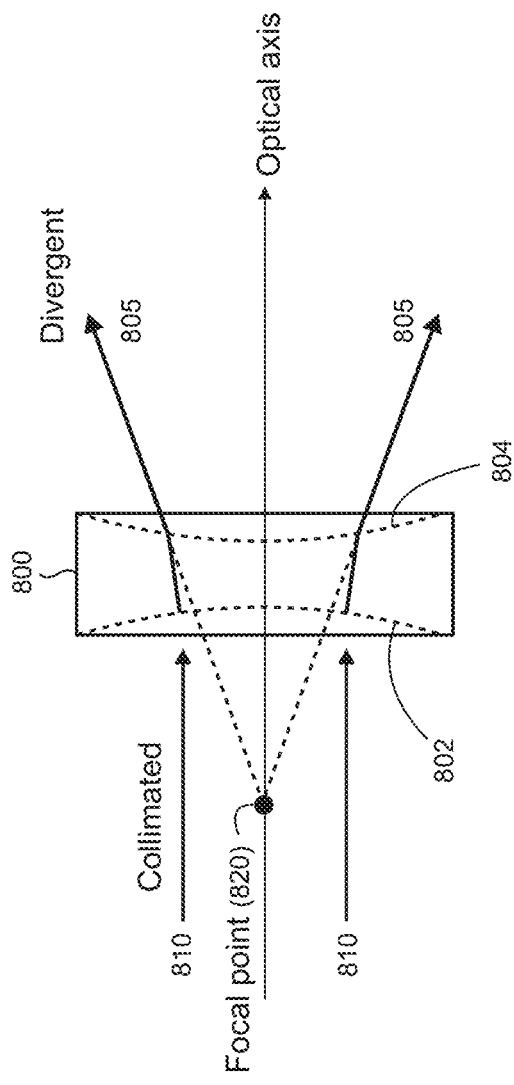
FIG. 8 shows a tunable lens that is configured so that collimated light entering the lens is divergent when exiting the lens.

FIG. 8 shows illustrative operations of an illustrative tunable lens 800. The operating principles shown in FIG. 8 and described below are equally applicable to both the entry tunable lens 610 (FIG. 6) and exit tunable lens 615. One or more optical surfaces of the tunable lens may be shaped through application of a signal to impart changes in direction of light rays so that focal length of the tunable lens can vary. For example, the signal may include one or more of electrical, mechanical, hydraulic, acoustic, or thermal signals.

Figure 9:
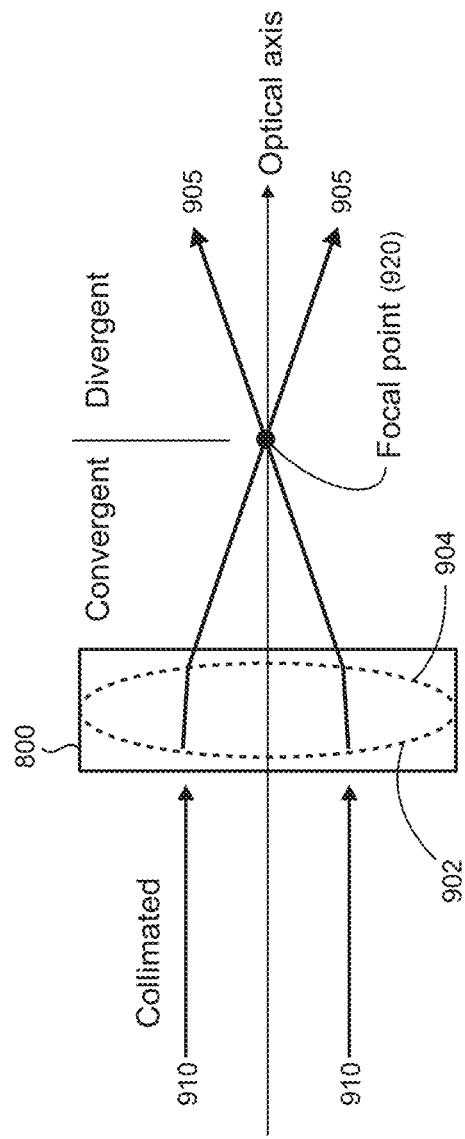
FIG. 9 shows a tunable lens that is configured so that collimated light entering the lens is convergent at a focal point when exiting the lens.

FIG. 8 shows the surfaces 802 and 804 of the tunable lens 800 in a configuration that causes exiting rays 805 to be more divergent compared to the entering rays 810 which are parallel (i.e., collimated). In this case, the focal point 820 of the tunable lens is located on the same side of the lens as the incident entry rays, and thus the focal length of the tunable lens is considered negative. FIG. 9 shows the surfaces 902 and 904 of the tunable lens 800 in a configuration that causes the exiting rays 905 to be more convergent compared to the collimated entering rays 910. Here, the focal point 920 is opposite to the side of the lens upon which the entering rays are incident. The exiting rays converge at the focal point and are divergent beyond the focal point, as shown.

The optical surfaces 802 and 804 of the tunable lens 800 can be configured with various different curvatures depending on the needs of a particular implementation of the variable optical attenuator. For example, FIGS. 10A-F show configurations (in which the entry side of the lens is shown on the left) including, respectively, biconvex, plano-convex, positive meniscus, negative meniscus, plano-concave, and biconcave. In some cases, combinations of the lens shapes may be utilized.

Figure 11:
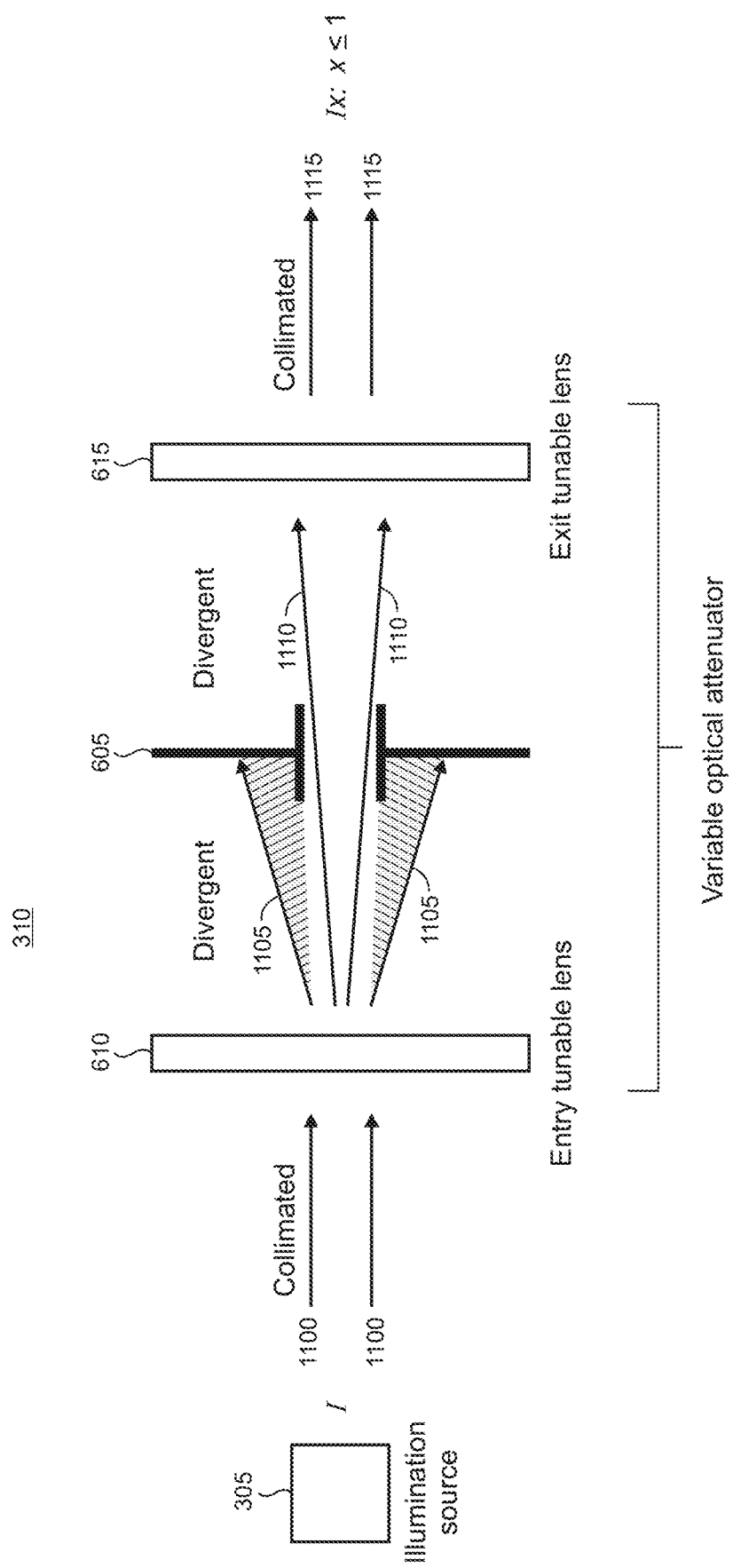
FIG. 11 shows operations of an illustrative variable optical attenuator.

FIG. 11 shows operations of an illustrative variable optical attenuator 310. Light output from the illumination source 305 is incident on the entry tunable lens 610. In this particular example, the incident light is collimated (as indicated by reference numerals 1100), but uncollimated light may also be utilized in some implementations. The entry tunable lens is operated responsively to a control signal from the controller 405 (FIG. 4) to thereby configure one or more of its optical surfaces 802 and 804 to cause the rays 1105 exiting from the lens to be more divergent compared to the incident rays. A portion of the output light from the illumination source is thus blocked by non-through portions of the aperture structure 605, as indicated by the shaded portions in the drawing.

A portion of the output light form the illumination source 305 is not blocked and propagates through the light-passing portion of the aperture structure 605, as shown by rays 1110. These rays remain divergent past the aperture structure. The exit tunable lens 615 is operated in response to a control signal to configure one or more of its optical surfaces to cause incident light rays to exit the lens as collimated rays 1115. Thus, the light entering and exiting the variable optical attenuator 310 have the same collimated characteristics. However, since a portion of the output light from the illumination source is blocked at the aperture structure 605, the output intensity from the variable optical attenuator is reduced compared to the input optical power I by a factor of x (where x≤1). The entry and exit tunable lenses effectively operate in reverse in which the entry tunable lens alters the direction of incident rays (to thereby cause some of the light to be blocked or clipped by the aperture structure), while the exit tunable lens changes the light direction again to match that of the output light from the source.

Other light characteristics can also be manipulated by suitable components that are instantiated in the variable optical attenuator. For example, polarization state, wavelength, and phase, among other characteristics may be altered by such components in which a first component may change a given characteristic and a second component may change the characteristic back to its original state.

FIGS. 12, 13, and 14 show operations of a first illustrative tunable lens 1200 that utilizes a thin bendable translucent glass membrane 1205 and piezo elements 1210 and 1212 that are disposed thereon. Tunable lenses having a similar configuration to that shown in FIG. 12 are commercially available under the trademark poLight TLens®. A polymer cushion 1215 is located between the membrane 1205 and a translucent glass support 1220. The piezo elements on the membrane are arranged to spherically deform the polymer cushion when a voltage is applied.

As shown in FIG. 12, when no voltage is applied to the piezo elements 1210 and 1212, the lens is in standby mode, and no force is applied to the membrane 1205. Light rays thus pass through the lens 1200 without alteration. For example, collimated light 1225 incident on the entry side of the lens 1200 remains collimated light 1230 at the lens exit. When a voltage from a suitable control signal is applied to the piezo elements 1210 and 1212, the elements function as an actuator to bend the thin glass membrane into a lens shape. Application of higher voltages at the piezo elements cause increased bending of the membrane. Thus, increased optical power is implemented in the tunable lens 1200 with a corresponding change in focal points 1305 and 1405, as respectively shown in FIGS. 13 and 14.

Figure 15:
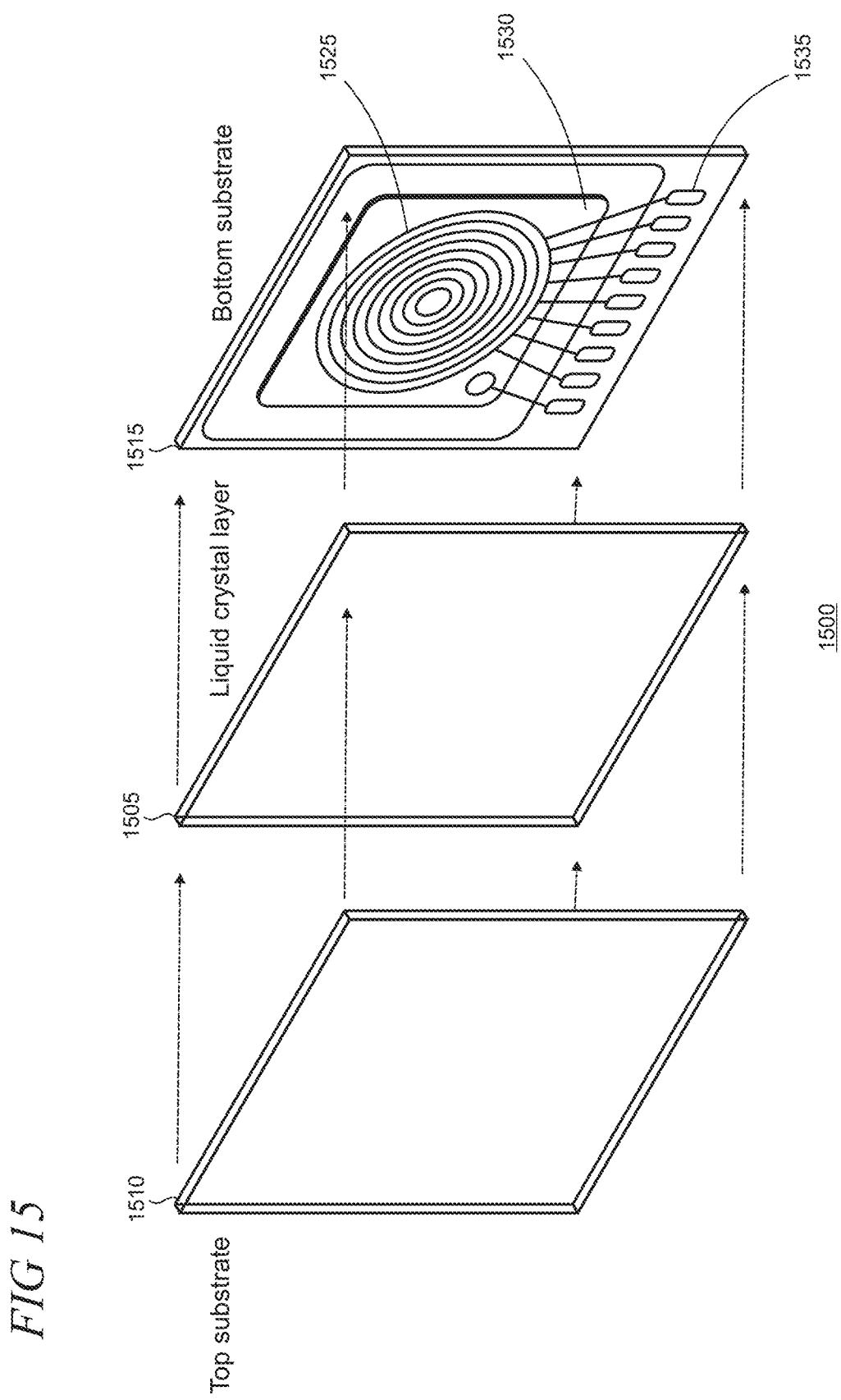
FIG. 15 shows an exploded view of a second illustrative tunable lens that utilizes liquid crystals and ring electrodes.

FIG. 15 shows an exploded view of a second illustrative tunable lens 1500 that utilizes liquid crystals and ring electrodes that may be configured for electrical modulation in response to an applied control signal. The lens 1500 comprises a layer 1505 of liquid crystal (LC) material that sits between a top substrate 1510 and a bottom substrate 1515 (it is noted that the terms top and bottom are used for reference purposes and the lens 1500 can be used in a variety of orientations depending on the needs of a given application). The top and bottom substrates can be made from polymer and/or glass depending on implementation and may further be configured as lenses and/or have other optical characteristics or functions (e.g., filtering, absorbing, polarizing, diffracting, waveguiding, or the like) in some cases.

The LC layer 1505 includes floating electrodes (not shown) that interoperate with concentric ring electrodes 1525 that are located in a bond layer 1530 proximate to the bottom substrate 1515. When an electric profile from the controller 405 (FIG. 4) is applied through edge conductors (representatively indicated by reference numeral 1535) to a particular region of the LC layer, the floating electrodes slide into place to fill gaps between the concentric electrodes. The floating electrodes enable increased optical performance of the tunable lens 1500 by reducing light scattering that could otherwise occur in the gaps between the concentric electrodes. Phase sampling across the lens plane is also increased through utilization of the floating electrodes which may further improve lens performance. Charge state in the LC layer is also readily maintained which makes the tunable LC lens highly energy efficient to preserve power which is typically limited in battery-powered systems such as HMD devices.

By controlling the electric profile applied to various portions of the LC layer 1505, the optical wavefront of the LC lens is analog-adjustable which enables infinitely-variable focus at any desired optical power, ranging between the maximum plus and maximum minus optical power of the lens. In addition, the wavefront shape can be controlled with fine-granularity by applying energy to specific regions of the lens. Such fine-grain control can be utilized to control the optics in a given display system to implement not only variable optical attenuation but support various features and user experiences and also correct for aberrations, distortion, refractive errors, and the like as well.

Figure 16:
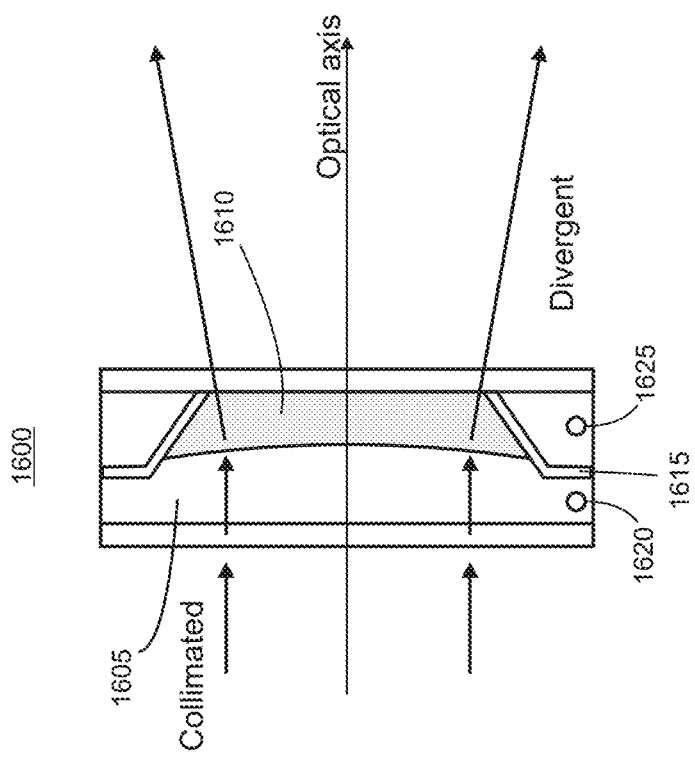
FIGS. 16 and 17 show operations of a third illustrative tunable lens that utilizes two immiscible fluids of different refractive indices.
Figure 17:
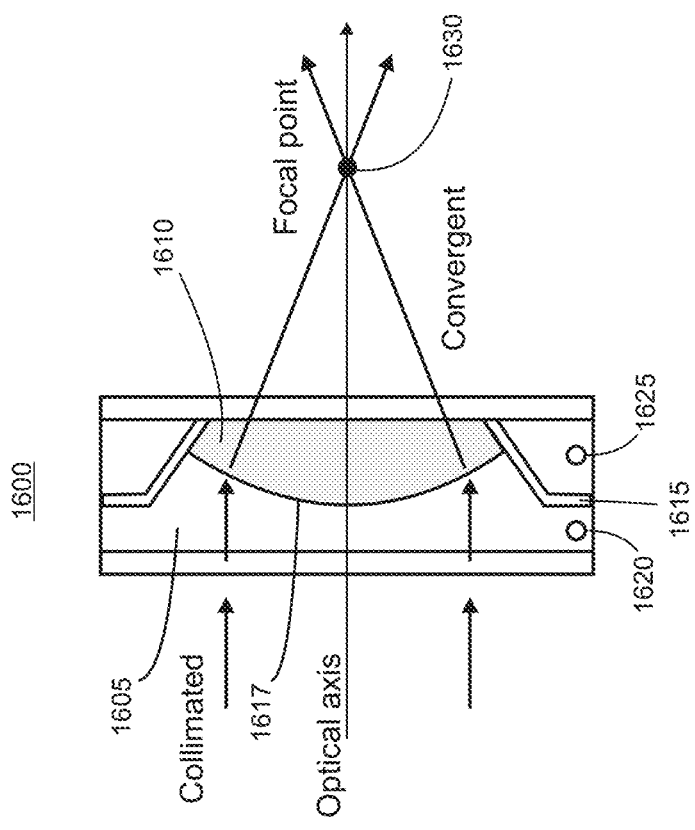

FIGS. 16 and 17 show operations of a third illustrative tunable lens 1600 that utilizes two immiscible fluids of different refractive indices. Tunable lens 1600 is a liquid lens that uses electrowetting technology. A first chamber in the tunable lens contains an electrically conducting liquid 1605 such as an aqueous solution, and a second chamber contains electrically non-conducting liquid 1610 such as oil. The interface 1617 between the liquids creates a meniscus that forms a natural diopter due to the difference in their respective refractive indices. An insulating layer 1615 is located in the lens between two electrodes 1620 and 1625.

To control the shape of the tunable lens, a control signal from the controller 405 (FIG. 4) applies an electric field across the electrodes and the aqueous solution wets the sidewalls of the first chamber, thereby altering the radius of curvature of the meniscus between the two fluids and thus the focal point 1630 of the tunable lens. By increasing the electric field, the surface of the initially convex lens can be made completely flat or even concave. As a result, it is possible to implement a lens that transitions from being convergent to divergent and vice versa, as shown in FIGS. 16 and 17.

Figure 18:
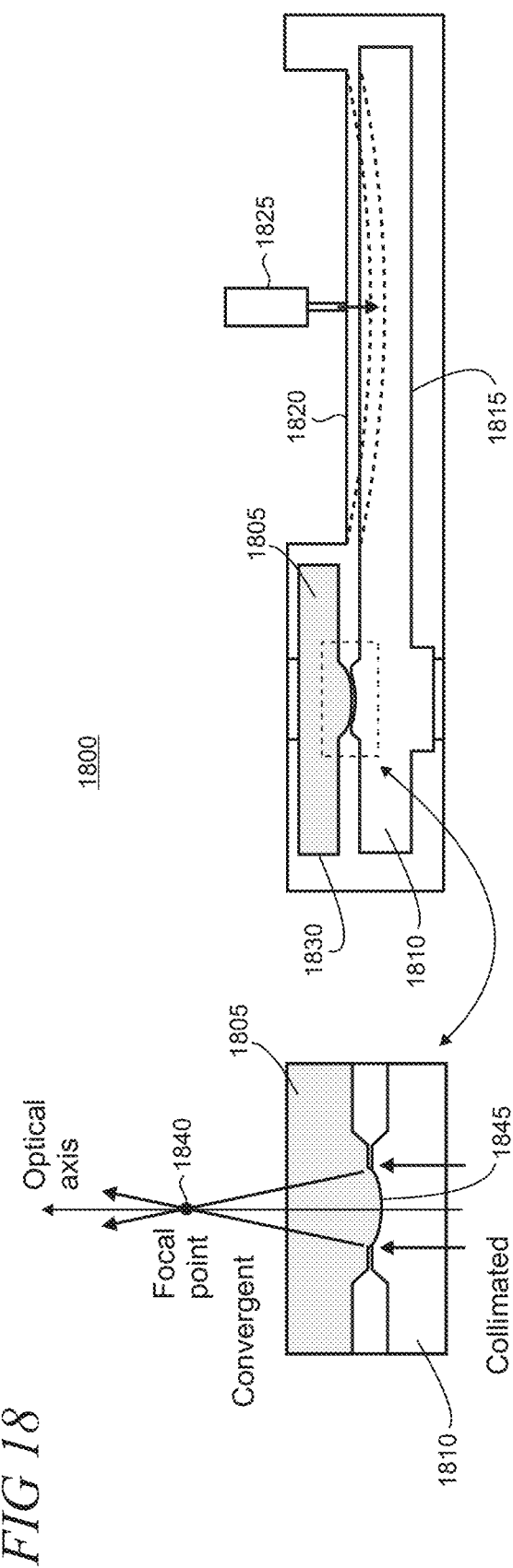
FIGS. 18, 19, and 20 show operations of a fourth illustrative tunable lens that uses a flexible membrane in which liquid is pumped into or out of a lens chamber.
Figure 20:
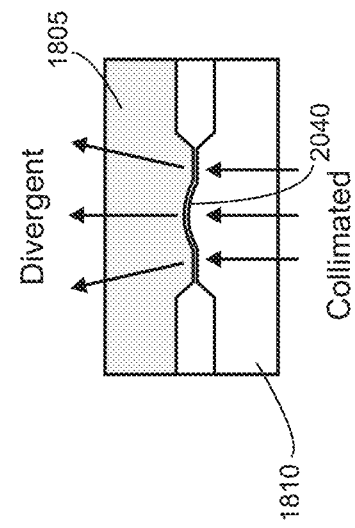
Figure 19:
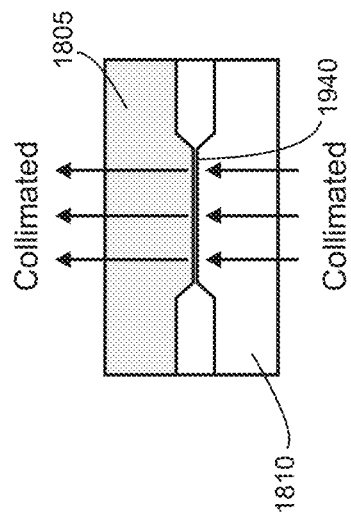

FIGS. 18, 19, and 20 show operation of a fourth illustrative tunable lens 1800 that uses a flexible membrane in which liquid is pumped into or out of a lens chamber. As with the tunable lens 1600 shown in FIGS. 16 and 17, the lens 1800 also uses two immiscible liquids 1805 and 1810 that respectively fill upper and lower chambers of the lens (it is noted that the terms upper and lower are used for reference purposes and the lens 1800 can be used in a variety of orientations depending on the needs of a given application).

The lower chamber 1815 is equipped with a deformable wall 1820 upon which an actuator 1825, in response to a control signal from the controller 405 (FIG. 4), can apply a force to change the volume of liquid in the upper chamber 1830. By doing so, the curvature of the interface between the two liquids changes shape. Thus, the interface can be convex, as indicated by reference numeral 1845 in the enlarged detail in FIG. 18, to enable collimated rays at the entrance of the tunable lens 1800 to be convergent rays at the focal point 1840 when exiting the lens. Responsively to a suitable control signal, the interface can be flat, as indicated by reference numeral 1940 in FIG. 19, so that the entry rays are unaffected by the lens (e.g., the rays enter and exit the lens as collimated rays). The interface can also be configured to be concave, as indicated by reference numeral 2040 in FIG. 20, to thereby cause collimated rays at the entrance to be divergent when exiting the lens.

FIG. 21 is a flowchart of an illustrative method 2100. Unless specifically stated, the methods or steps shown in the flowchart and described in the accompanying text are not constrained to a particular order or sequence. In addition, some of the methods or steps thereof can occur or be performed concurrently and not all the methods or steps have to be performed in a given implementation depending on the requirements of such implementation and some methods or steps may be optionally utilized.

In step 2105, a first tunable lens is configured to apply optical power that is variable in response to a first signal from a controller. In step 2110 a second tunable lens is configured to apply optical power that is variable in response to a second signal from the controller. In step 2115, the first tunable lens is operated, in response to the first control signal, to apply optical power to light received from the illumination source such that the light is passed through the aperture or partially clipped by the aperture structure. In step 2120, the second tunable lens is operated, in response to the second control signal, to apply optical power to light passed through the aperture, in which the applied optical power at the second tunable lens is opposite to the optical power applied at the first tunable lens.

Figure 22:
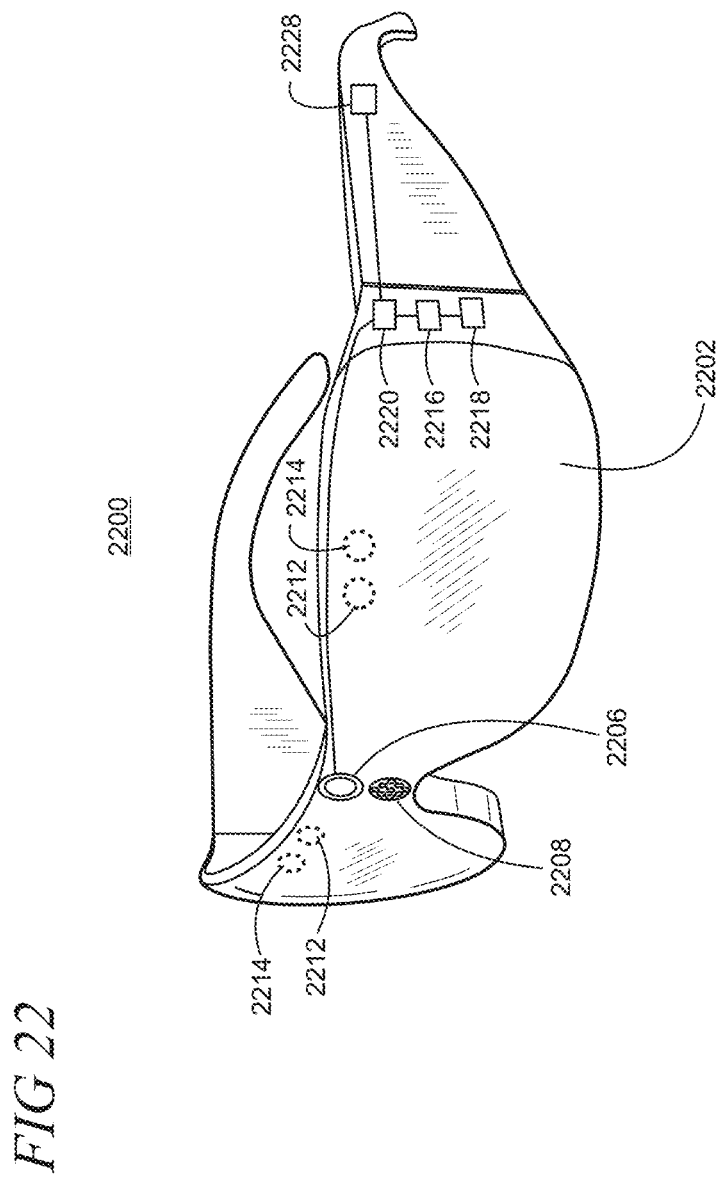
FIG. 22 is a pictorial view of an illustrative example of a virtual reality or augmented reality HMD device that can incorporate a variable optical attenuator.
Figure 23:
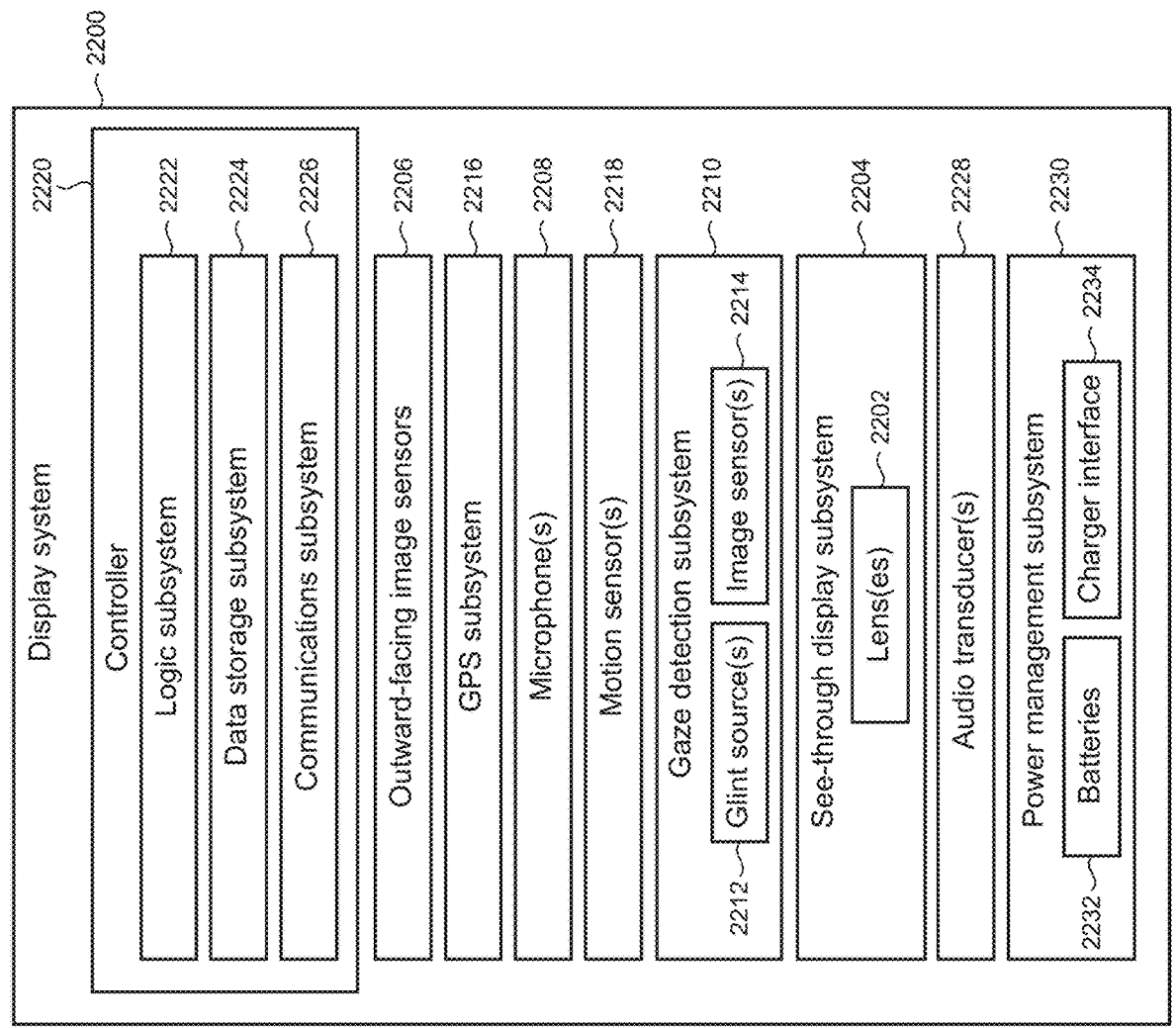
FIG. 23 shows a block diagram of an illustrative example of a virtual reality or augmented reality HMD device.

The variable optical attenuator described above may be utilized in mixed-reality or virtual-reality applications. FIG. 22 shows one particular illustrative example of a mixed-reality or virtual-reality HMD device 2200, and FIG. 23 shows a functional block diagram of the device 2200. HMD device 2200 comprises one or more lenses 2202 that form a part of a see-through display subsystem 2204, so that images may be displayed using lenses 2202 (e.g. using projection onto lenses 2202, one or more waveguide systems, such as a near-eye optical display system, incorporated into the lenses 2202, and/or in any other suitable manner). HMD device 2200 further comprises one or more outward-facing image sensors 2206 configured to acquire images of a background scene and/or physical environment being viewed by a user and may include one or more microphones 2208 configured to detect sounds, such as voice commands, from a user. Outward-facing image sensors 2206 may include one or more depth sensors and/or one or more two-dimensional image sensors. In alternative arrangements, as noted above, a mixed-reality or virtual-reality display system, instead of incorporating a see-through display subsystem, may display mixed-reality or virtual-reality images through a viewfinder mode for an outward-facing image sensor.

The HMD device 2200 may further include a gaze detection subsystem 2210 configured for detecting a direction of gaze of each eye of a user or a direction or location of focus, as described above. Gaze detection subsystem 2210 may be configured to determine gaze directions of each of a user's eyes in any suitable manner. For example, in the illustrative example shown, a gaze detection subsystem 2210 includes one or more glint sources 2212, such as infrared light sources, that are configured to cause a glint of light to reflect from each eyeball of a user, and one or more image sensors 2214, such as inward-facing sensors, that are configured to capture an image of each eyeball of the user. Changes in the glints from the user's eyeballs and/or a location of a user's pupil, as determined from image data gathered using the image sensor(s) 2214, may be used to determine a direction of gaze.

In addition, a location at which gaze lines projected from the user's eyes intersect the external display may be used to determine an object at which the user is gazing (e.g. a displayed virtual object and/or real background object). Gaze detection subsystem 2210 may have any suitable number and arrangement of light sources and image sensors. In some implementations, the gaze detection subsystem 2210 may be omitted.

The HMD device 2200 may also include additional sensors. For example, HMD device 2200 may comprise a global positioning system (GPS) subsystem 2216 to allow a location of the HMD device 2200 to be determined. This may help to identify real-world objects, such as buildings, etc. that may be located in the user's adjoining physical environment.

The HMD device 2200 may further include one or more motion sensors 2218 (e.g., inertial, multi-axis gyroscopic, or acceleration sensors) to detect movement and position/orientation/pose of a user's head when the user is wearing the system as part of a mixed-reality or virtual-reality HMD device. Motion data may be used, potentially along with eye-tracking glint data and outward-facing image data, for gaze detection, as well as for image stabilization to help correct for blur in images from the outward-facing image sensor(s) 2206. The use of motion data may allow changes in gaze direction to be tracked even if image data from outward-facing image sensor(s) 2206 cannot be resolved.

In addition, motion sensors 2218, as well as microphone(s) 2208 and gaze detection subsystem 2210, also may be employed as user input devices, such that a user may interact with the HMD device 2200 via gestures of the eye, neck, and/or head, as well as via verbal commands in some cases. It may be understood that sensors illustrated in FIGS. 22 and 23 and described in the accompanying text are included for the purpose of example and are not intended to be limiting in any manner, as any other suitable sensors and/or combination of sensors may be utilized to meet the needs of a particular implementation. For example, biometric sensors (e.g., for detecting heart and respiration rates, blood pressure, brain activity, body temperature, etc.) or environmental sensors (e.g., for detecting temperature, humidity, elevation, UV (ultraviolet) light levels, etc.) may be utilized in some implementations.

The HMD device 2200 can further include a controller 2220 such as one or more processors having a logic subsystem 2222 and a data storage subsystem 2224 in communication with the sensors, gaze detection subsystem 2210, display subsystem 2204, and/or other components through a communications subsystem 2226. The communications subsystem 2226 can also facilitate the display system being operated in conjunction with remotely located resources, such as processing, storage, power, data, and services. That is, in some implementations, an HMD device can be operated as part of a system that can distribute resources and capabilities among different components and subsystems.

The storage subsystem 2224 may include instructions stored thereon that are executable by logic subsystem 2222, for example, to receive and interpret inputs from the sensors, to identify location and movements of a user, to identify real objects using surface reconstruction and other techniques, and dim/fade the display based on distance to objects so as to enable the objects to be seen by the user, among other tasks.

The HMD device 2200 is configured with one or more audio transducers 2228 (e.g., speakers, earphones, etc.) so that audio can be utilized as part of a mixed-reality or virtual-reality experience. A power management subsystem 2230 may include one or more batteries 2232 and/or protection circuit modules (PCMs) and an associated charger interface 2234 and/or remote power interface for supplying power to components in the HMD device 2200.

It may be appreciated that the HMD device 2200 is described for the purpose of example, and thus is not meant to be limiting. It may be further understood that the display device may include additional and/or alternative sensors, cameras, microphones, input devices, output devices, etc. than those shown without departing from the scope of the present arrangement. Additionally, the physical configuration of an HMD device and its various sensors and subcomponents may take a variety of different forms without departing from the scope of the present arrangement.

Figure 24:
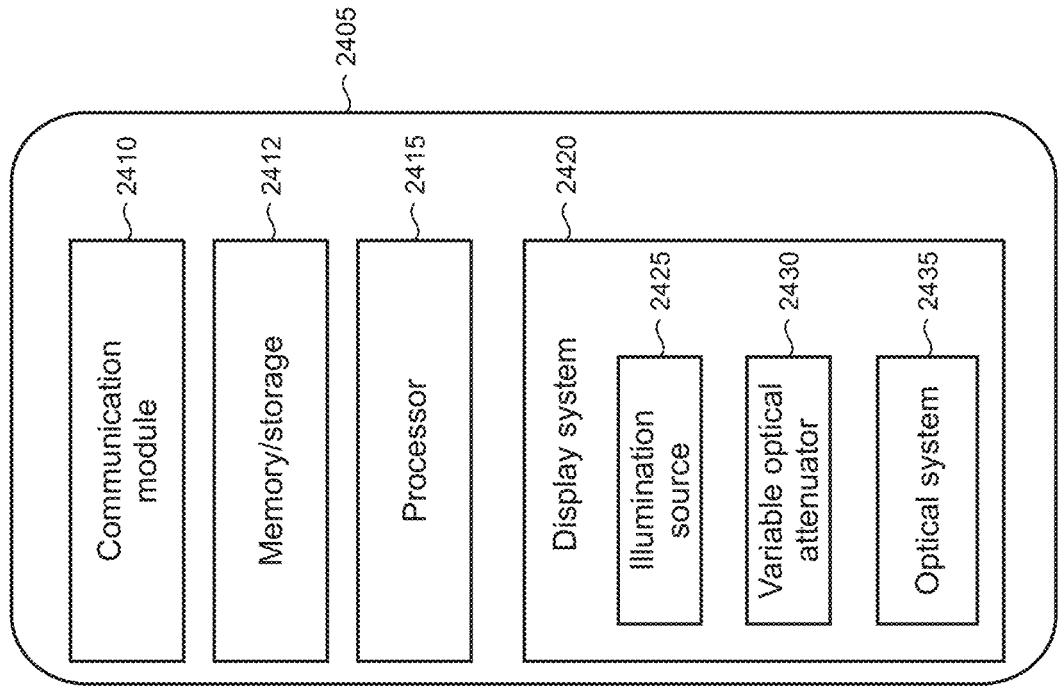
FIG. 24 shows a block diagram of an illustrative electronic device that may incorporate a variable optical attenuator.

As shown in FIG. 24, a variable optical attenuator can be used in a mobile or portable electronic device 2400, such as a mobile phone, smartphone, personal digital assistant (PDA), communicator, portable Internet appliance, handheld computer, digital video or still camera, wearable computer, computer game device, specialized bring-to-the-eye product for viewing, or other portable electronic device. As shown, the portable device 2400 includes a housing 2405 to house a communication module 2410 for receiving and transmitting information from and to an external device, or a remote system or service (not shown). Memory and data storage (collectively indicated by reference numeral 2412) is also supported on the portable device.

The portable device 2400 may also include a processor 2415 using one or more central processing units and/or graphics processors for processing stored and/or received data to generate virtual images. A display system 2420 is configured to support viewing of images. The display system can include an illumination source 2425, a variable optical attenuator 2430 and an optical system 2435 which may include an EPE. The processor 2415 may be operatively connected to the illumination source 2425 to provide image data, such as video data so that images may be displayed using the optical system 2435.

The device 2400 can also be adapted for installations in equipment such as automobiles and other vehicles. For example, the components shown in the device 2400 may be configured for HUD applications using a suitable projection and display system (not shown) as will be readily understood by one of skill in the art.

Various exemplary embodiments of the present variable attenuation of an illumination source are now presented by way of illustration and not as an exhaustive list of all embodiments. An example includes method for variably controlling intensity of an illumination source using an aperture structure having an aperture therethrough, comprising: a first tunable lens having an optical axis and located along the light path to receive light rays having an initial state as an input from the illumination source, and comprising at least one configurable optical surface for controlling optical power of the first tunable lens; an aperture structure having an aperture that is co-axially aligned with the optical axis of the first tunable lens, the aperture structure positioned along the light path to receive light rays exiting from the first tunable lens; and a second tunable lens having an optical axis that is co-axially aligned with the aperture and the optical axis of the first tunable lens, the second tunable lens positioned along the light path to receive light rays passed through the aperture, and comprising at least one configurable optical surface for controlling optical power of the second tunable lens, wherein the first tunable lens is controllably operated to cause the light rays exiting from the first tunable lens i) to be at least partially blocked by the aperture structure, and at least partially passed by the aperture to the second tunable lens, or ii) fully passed through the aperture to the second tunable lens, and wherein the second tunable lens is controllably operated to cause the light rays exiting from the second tunable lens to have substantially the same initial state as the light rays that are input to the first tunable lens.

In another example light rays from the illumination source are collimated and the first tunable lens is operated to cause light rays received from the illumination source to be divergent when exiting the first tunable lens so that a portion of light rays received at the aperture structure is blocked by the aperture structure. In another example, the second tunable lens is operated to cause light rays passed through the aperture to be collimated when exiting the second tunable lens. In another example the first tunable lens is operated to increase the divergence of the light rays from the illumination source to thereby increase light clipping at the aperture structure. In another example, the method further providing first and second signals to the respective first and second tunable lenses to dynamically control attenuation of the illumination source. In another example, the aperture structure is configured with variable aperture size, and the method further comprises varying the aperture size in response to a third signal from a controller.

A further example includes a variable optical attenuator configured to receive light rays from an illumination source along a light path, comprising: a first tunable lens having an optical axis and located along the light path to receive light rays having an initial state as an input from the illumination source, and comprising at least one configurable optical surface for controlling optical power of the first tunable lens; an aperture structure having an aperture that is co-axially aligned with the optical axis of the first tunable lens, the aperture structure positioned along the light path to receive light rays exiting from the first tunable lens; and a second tunable lens having an optical axis that is co-axially aligned with the aperture and the optical axis of the first tunable lens, the second tunable lens positioned along the light path to receive light rays passed through the aperture, and comprising at least one configurable optical surface for controlling optical power of the second tunable lens, wherein the first tunable lens is controllably operated to cause the light rays exiting from the first tunable lens i) to be at least partially blocked by the aperture structure, and at least partially passed by the aperture to the second tunable lens, or ii) to be fully passed through the aperture to the second tunable lens, and wherein the second tunable lens is controllably operated to cause the light rays exiting from the second tunable lens to have substantially the same initial state as the light rays that are input to the first tunable lens.

In another example, the controllable operation of the first tunable lens includes configuring the at least one optical surface to cause the exiting light rays to be more divergent relative to the input light rays or more convergent relative to the input light rays. In another example, the aperture in the aperture structure is configured to have variable size. In another example, light rays in the initial state are collimated light rays. In another example, at least one configurable optical surface in the first tunable lens or second tunable lens comprises a flexible translucent membrane on which piezo material is disposed, the membrane being at least partially spherically deformable when a voltage is applied to the piezo material, wherein deformation of the membrane increases with increasing applied voltage. In another example, the at least one configurable optical surface in the first tunable lens or second tunable lens comprises an interface between two immiscible liquids, wherein a shape of the interface is changeable based on electrowetting or hydraulic pressure. In another example, the at least one configurable optical surface in the first tunable lens or second tunable lens comprises liquid crystals wherein floating electrodes in the liquid crystals fill gaps between concentric electrodes in the first tunable lens or the second tunable lens, and wherein the floating electrodes and concentric electrodes are electrically modulated to assume a particular wavefront shape. In another example, the variable optical attenuator further comprises a controller adapted to apply an electric profile to various portions of a liquid crystal material layer through electrical contacts to the concentric electrodes.

A further example includes an optical display system, comprising: a controller; an illumination source; and a variable optical attenuator comprising a first tunable lens that is configured to implement variable optical power responsively to the controller, a second tunable lens that is configured to implement variable optical power responsively to the controller, an aperture structure having an aperture, the aperture structure being sandwiched between a first tunable lens and a second tunable lens, and the aperture and first and second tunable lenses being co-axially disposed along a light path extending from the illumination source.

In another example, the optical display system further comprises a second variable optical attenuator disposed along the light path between the first and second tunable lenses. In another example, the illumination source comprises one of laser, laser diode, light emitting diode (LED), micro-LED, superluminescent LED (SLED), or organic light emitting diode (OLED). In another example, the optical display system further comprises a display, the display being adapted to implement a head-mounted display (HMD) or a heads-up display (HUD). In another example, the optical display system further comprises a controller adapted to control the first and second tunable optical lenses to apply opposite optical power. In another example, the optical display system further comprises a controller adapted to control the optical power of the first tunable lens to cause light from the illumination source to be clipped by the aperture structure to thereby reduce optical intensity of the light.

The subject matter described above is provided by way of illustration only and is not to be construed as limiting. Various modifications and changes may be made to the subject matter described herein without following the example embodiments and applications illustrated and described, and without departing from the true spirit and scope of the present invention, which is set forth in the following claims.

What is claimed:

1. A method for variably controlling intensity of an illumination source along a light path using an aperture structure having an aperture therethrough, comprising:
   a first tunable lens having an optical axis and located along the light path to receive light rays having an initial collimated state as an input from the illumination source, and comprising at least one configurable optical surface for controlling optical power of the first tunable lens;

an aperture structure having an aperture that is co-axially aligned with the optical axis of the first tunable lens, the aperture structure positioned along the light path to receive light rays exiting from the first tunable lens; and a second tunable lens having an optical axis that is co-axially aligned with the aperture and the optical axis of the first tunable lens, the second tunable lens positioned along the light path to receive light rays passed through the aperture, and comprising at least one configurable optical surface for controlling optical power of the second tunable lens, wherein the first tunable lens is controllably operated to cause the light rays exiting from the first tunable lens i) to be at least partially blocked by the aperture structure, and at least partially passed by the aperture to the second tunable lens, or ii) fully passed through the aperture to the second tunable lens, and wherein the second tunable lens is controllably operated to cause the light rays exiting from the second tunable lens to be collimated in the same initial collimated state as the light rays that are input to the first tunable lens wherein the first and second tunable lenses are controllably operated to impart no optical power to the light rays exiting from the second tunable lens.

2. The method of claim 1 in which the first tunable lens is operated to cause light rays received from the illumination source to be divergent when exiting the first tunable lens so that a portion of light rays received at the aperture structure is blocked by the aperture structure.

3. The method of claim 2 in which light rays passed through the aperture are divergent when entering the second tunable lens.

4. The method of claim 2 in which the first tunable lens is operated to increase the divergence of the light rays from the illumination source to thereby increase light clipping at the aperture structure.

5. The method of claim 1 further including providing first and second signals to the respective first and second tunable lenses to dynamically control attenuation of the illumination source.

6. The method of claim 5 in which the aperture structure is configured with variable aperture size, and further comprising varying the aperture size in response to a third signal from a controller.

7. A variable optical attenuator configured to receive light rays from an illumination source along a light path, comprising:

a first tunable lens having an optical axis and located along the light path to receive collimated light rays having an initial state as an input from the illumination source, and comprising at least one configurable optical surface for controlling optical power of the first tunable lens;

an aperture structure having an aperture that is co-axially aligned with the optical axis of the first tunable lens, the aperture structure positioned along the light path to receive light rays exiting from the first tunable lens; and a second tunable lens having an optical axis that is co-axially aligned with the aperture and the optical axis of the first tunable lens, the second tunable lens positioned along the light path to receive light rays passed through the aperture, and comprising at least one configurable optical surface for controlling optical power of the second tunable lens, wherein the first tunable lens is controllably operated to cause the light rays exiting from the first tunable lens i) to be at least partially blocked by the aperture structure, and at least partially passed by the aperture to the second tunable lens, or ii) to be fully passed through the aperture to the second tunable lens, and wherein the second tunable lens is controllably operated to cause the light rays exiting from the second tunable lens to be collimated in the same initial state as the collimated light rays that are input to the first tunable lens wherein the first and second tunable lenses are controllably operated to impart no optical power to the light rays exiting from the second tunable lens.

8. The variable optical attenuator of claim 7 in which the controllable operation of the first tunable lens includes configuring the at least one optical surface to cause the exiting light rays to be more divergent relative to the input light rays or more convergent relative to the input light rays.

9. The variable optical attenuator of claim 7 in which the aperture in the aperture structure is configured to have variable size.

10. The variable optical attenuator of claim 7 in which the at least one configurable optical surface in the first tunable lens or second tunable lens comprises a flexible translucent membrane on which piezo material is disposed, the membrane being at least partially spherically deformable when a voltage is applied to the piezo material, wherein deformation of the membrane increases with increasing applied voltage.

11. The variable optical attenuator of claim 7 in which the at least one configurable optical surface in the first tunable lens or second tunable lens comprises an interface between two immiscible liquids, wherein a shape of the interface is changeable based on electrowetting or hydraulic pressure.

12. The variable optical attenuator of claim 7 in which the at least one configurable optical surface in the first tunable lens or second tunable lens comprises liquid crystals wherein floating electrodes in the liquid crystals fill gaps between concentric electrodes in the first tunable lens or the second tunable lens, and wherein the floating electrodes and concentric electrodes are electrically modulated to assume a particular wavefront shape.

13. The variable optical attenuator of claim 12 further comprising a controller adapted to apply an electric profile to various portions of a liquid crystal material layer through electrical contacts to the concentric electrodes.

14. An optical display system, comprising:
a controller;
an illumination source configured to generate collimated light rays; and
a variable optical attenuator comprising
a first tunable lens that is configured to implement variable optical power responsively to the controller,
a second tunable lens that is configured to implement variable optical power responsively to the controller, and
an aperture structure having an aperture, the aperture structure being sandwiched between a first tunable lens and a second tunable lens, and the aperture and first and second tunable lenses being co-axially disposed along a light path extending from the illumination source over which the light rays propagate, wherein the first and second tunable lenses are controllably operated to impart no optical power to light rays exiting the second tunable lens along the light path.

15. The optical display system of claim 14 further comprising a second variable optical attenuator disposed along the light path between the first and second tunable lenses.

16. The optical display system of claim 14 in which the illumination source comprises one of laser, laser diode, light emitting diode (LED), micro-LED, superluminescent LED (SLED), or organic light emitting diode (OLED).

17. The optical display system of claim 14 further comprising a display, the display being adapted to implement a head-mounted display (HMD) or a heads-up display (HUD).

18. The optical display system of claim 17 further comprising a controller adapted to control the first and second tunable optical lenses to apply opposite optical power.

19. The optical display system of claim 17 further comprising a controller adapted to control the optical power of the first tunable lens to cause light rays from the illumination source to be clipped by the aperture structure to thereby reduce optical intensity of the light.

* * * * *